United States Patent [19]
Anderson

[11] 3,924,604
[45] Dec. 9, 1975

[54] SOLAR ENERGY CONVERSION SYSTEM
[75] Inventor: Donald E. Anderson, Northfield, Minn.
[73] Assignee: G. T. Schjeldahl Company, Northfield, Minn.
[22] Filed: May 31, 1974
[21] Appl. No.: 475,164

[52] U.S. Cl. ............................ 126/270; 60/641
[51] Int. Cl.² .................................. F24J 3/02
[58] Field of Search ............... 126/270, 271; 60/641

[56] References Cited
UNITED STATES PATENTS
| 260,657 | 7/1882 | Calver | 126/270 |
| 514,669 | 2/1894 | Allingham | 126/270 |

FOREIGN PATENTS OR APPLICATIONS
| 353,007 | 10/1937 | Italy | 126/270 |
| 1,374,397 | 7/1963 | France | 126/271 |
| 986,969 | 4/1951 | France | 126/270 |

Primary Examiner—William F. O'Dea
Assistant Examiner—Peter D. Ferguson
Attorney, Agent, or Firm—Orrin M. Haugen

[57] ABSTRACT

A solar energy concentrator system which includes a centrally disposed column supporting a solar receiver means, and having an array of pivotally mounted support pads disposed circumferentially therearound. Each of the support pads retains a plurality of pivotally mounted solar reflective elements which are arranged to tilt about the axis of the pivotal mounting means and thereby direct reflected solar energy upon the solar receiver. The solar reflective elements are preferably generally planar, and are provided with means for tiltable as well as lateral adjustment so as to produce a Fresnel approximation of a large area reflector, and thereby increase the portion of solar energy reflected by the reflective elements onto the solar receiver.

9 Claims, 13 Drawing Figures

SOLAR ENERGY CONVERSION SYSTEM

BACKGROUND OF THE INVENTION

The present invention relates generally to a solar energy concentrator means, and more specifically to a solar energy concentrator system which includes a centrally disposed column having a solar receiver or solar energy collection means arranged thereon, with the column being surrounded by a plurality of pivotally mounted support pads, each pad carrying a number of adjustably positionable solar reflective elements. In order to effectively utilize each of the individual reflective elements in the best and most efficient fashion, the solar receiver is preferably arranged in a generally conical fashion, thus providing an effective receiver zone having a portion lying in a plane normal to the reflective incoming radiation. The system provides means for controlling azimuth of the reflective elements through pivotal rotation of the individual support pads, with the elevation angles being controlled by pivotally adjusting the angular disposition of each individual reflective element. The system is designed to provide a substantial amount of useful reflective area, with the packing of the individual reflective elements providing minimal shadowing and screening of neighboring reflective elements.

Solar energy may be employed as a high-grade power source for energy conversion. This conversion of energy is achieved by thermodynamic arrangements, such as, for example, by the generation of steam for ultimate utilization at a power conversion site.

It has been stated that the total projected electrical power demand for the United States in the year 1980 will be approximately $9 \times 10^{12}$ kilowatt-hours. This power demand is equivalent to that amount of incident solar radiation falling upon an area of only 1,531 square miles of land at approximately 33° North latitude. Such a latitude is consistent with that of the State of Arizona. Assuming an efficiency of conversion of solar energy to electrical energy of only 15 percent, an area of 10,000 square miles may reasonably be expected to provide a substantial portion of the projected electrical power demand in the United States for the year 1980.

Solar energy is, of course, available for conversion without expending large quantities of depletable fossil fuels. The system of the present invention renders it possible to efficiently and economically convert solar energy to other forms of energy at a cost which is no greater than that required for fossil fuel conversion.

While sunlight is not available as a 24-hour per day source of energy, the sun is, nevertheless, available for a maximum of 50 percent of the time of a given year at any given location. There will be a reduction from the 50 percent figure occasioned by cloud cover and the like, however, it is possible to supplement fossil fuels with a utilization of these fossil fuels only during the night-time hours or upon occassion of heavy cloud cover.

The system of the present invention employs a large array of relatively simple heliostats which are focused upon a solar receiver preferably in the form of a centrally disposed annular boiler. It is possible to achieve virtually 100 percent solar power dependency by utilizing storage through thermal storage, reversible hydraulic pumping, reversible electrolysis or electrolytic cells, or electrolysis with storage of evolved hydrogen and oxygen subsequently being burned to replace the fossil fuels which may otherwise be required. Local weather forecasting techniques are sufficiently sophisticated so as to provide a reasonably accurate prediction for a 24-hour period, hence it is possible to anticipate demand requirements and availabilty of solar energy.

SUMMARY OF THE INVENTION

Briefly, in accordance with the present invention, a solar energy concentrator means is provided which includes a centrally disposed column having a solar receiver arranged at an elevated disposition thereon, and with an array of pivotally mounted support pads disposed circumferentially about the column, with each pad containing a plurality of rows and columns of solar reflective elements thereon. Means are provided for pivotally rotating the support pads so as to achieve the proper azimuth angle of the reflective elements relative to the sun, with further means being provided to control the angular elevation of the solar reflective elements so as to enable collection of a substantial portion of the incident solar radiation falling upon the area covered by the solar reflective elements. The individual reflective elements are preferably planar in nature, and in order to achieve Fresnel approximation under a variety of solar dispositions, those individual reflective elements which are disposed in the outer columns on the individual pads are preferably provided with means for adjustably controlling the angular dispositions of the reflective element on the pad so as to effectively increase the quantity of energy collected at the collection site.

The individual reflective elements present a relatively low profile to external loading caused by wind. Therefore, no unusual means are required to render the individual pads stationary because of external wind loading conditions.

It will be apparent that the individual supporting pads are, in effect, individual turntables which are provided with means for rotating the supporting pads about the central axis. In order to achieve minimal loading on the individual bearings which are employed in the central shaft, the individual pad may be mounted coaxially within a rigid water-tight chamber, and with appropriate floatation lips, it is possible to float the entire pad and thus achieve minimal loading on the support bearings and columns.

In order to achieve adjustable control of the angular elevation of the individual reflective elements, means may be provided so as to gang entire columns of reflective elements together, and with a single drive motor, the group of individual ganged reflective elements may be controllably positioned. Similar techniques may be utilized in order to control the fine adjustment of these individual columns, thus achieving a Fresnel approximation of a parabolic mirror. In summary, therefore, the individual elements are rotated and tilted in order to follow the sun and cause the incident solar radiation to be concentrated and received continuously at a remote collection site.

Therefore, it is a primary object of the present invention to provide an improved solar energy concentrator means which utilizes a centrally disposed column having a solar receiver thereon, and an array of pivotally mounted support pads disposed circumferentially therearound, each support pad retaining a plurality of angularly adjustable solar reflective elements arranged in rows and columns thereon and adjusted to achieve Fresnel approximation to a parabolic mirror for the delivering of incident solar radiation onto a central receiver.

It is a further object of the present invention to provide a relatively stable, reliable, and simple solar energy collector means which utilizes a centrally disposed column having a solar receiver means arranged thereon, and with an array of pivotally mounted support pads arranged circumferentially about the column, with each support pad having a plurality of rows and columns of solar reflective elements disposed thereon, with drive means being provided to controllably rotate the angular disposition of each support pad, and with additional drive means being provided to control the angular disposition of the individual solar reflective elements on each support pad.

It is yet a further object of the present invention to provide an improved solar energy concentrator means which employs a plurality of generally planar solar reflective elements disposed about a centrally disposed solar collection site, with means being provided to control the angular disposition of each solar reflective element so as to minimize shading and screening of each solar reflective element from its neighbors, thereby achieving collection of a substantial portion of the incident solar radiation falling upon the area occupied by the solar reflective elements.

Other and further objects of the present invention will become apparent to those skilled in the art upon a study of the following specification, appended claims, and accompanying drawings.

DESCRIPTION OF THE PREFERRED EMBODIMENT

Figure 1:
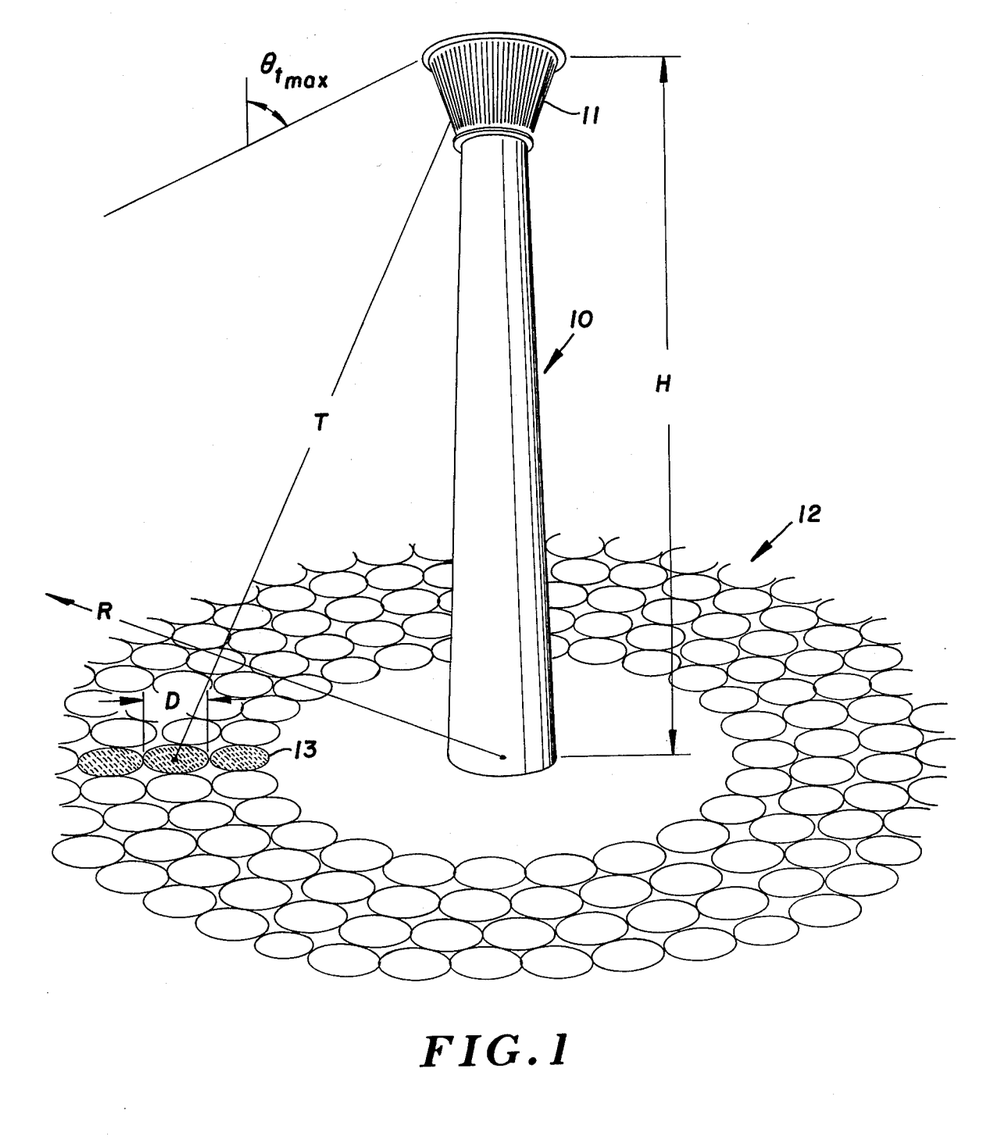
FIG. 1 is a perspective view of a preferred embodiment of a solar energy concentrator system arranged in accordance with the present invention, and illustrating a centrally disposed column means having a solar collection site thereon, with the column being surrounded by an array of support pads, each pad supporting a plurality of solar reflective elements thereon.
Figure 2:
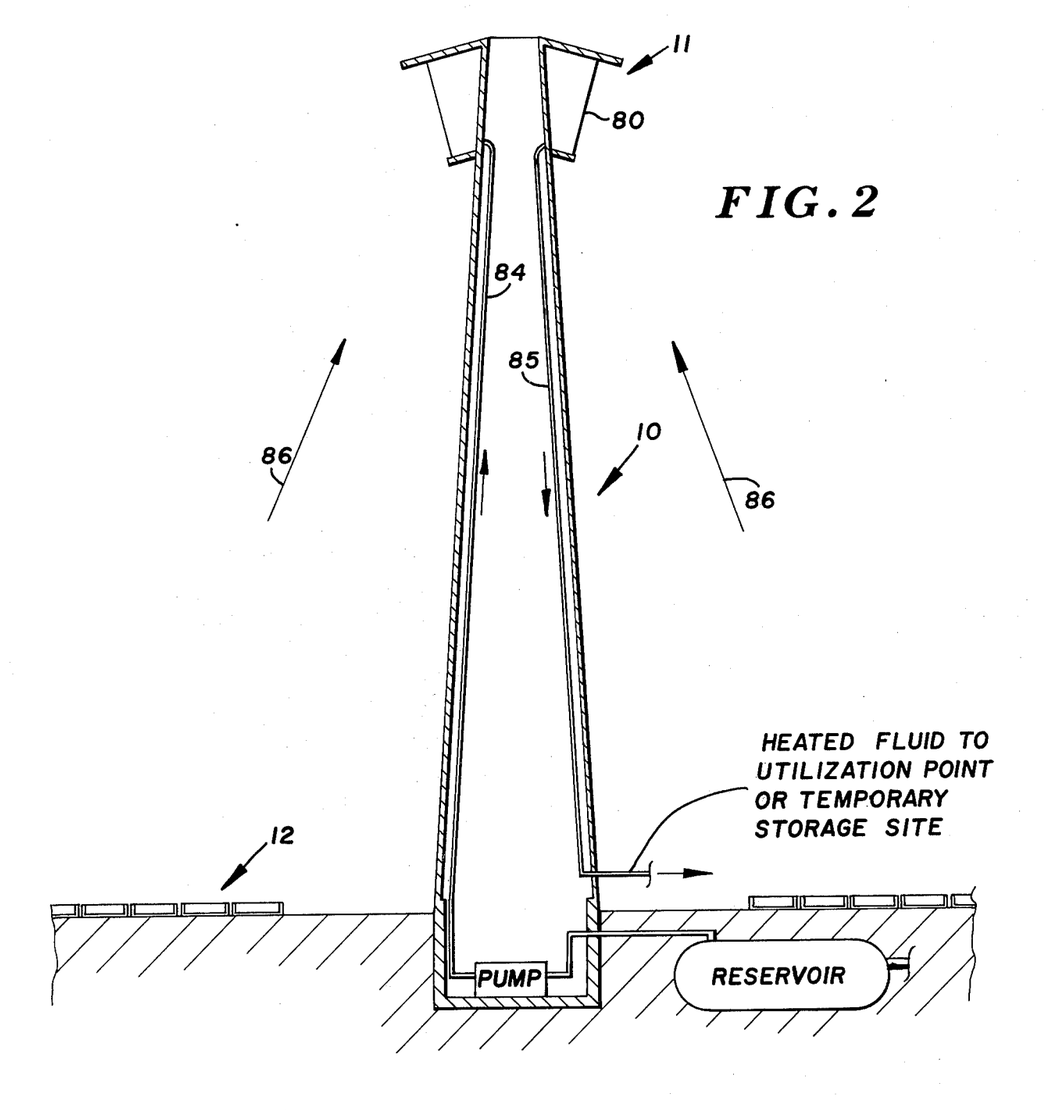
FIG. 2 is a vertical sectional view of a solar energy concentrator system as illustrated in FIG. 1, with FIG. 2 being taken generally diametrically of the support column and illustrating a number of support pads disposed circumferentially outwardly of the column.
Figure 5:
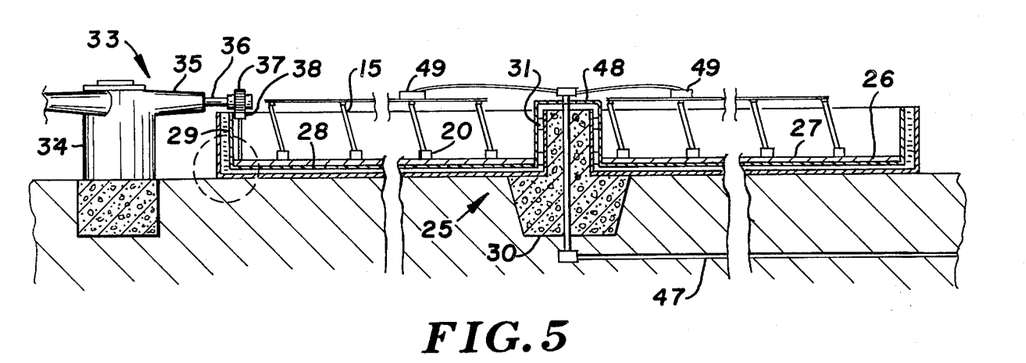
FIG. 5 is a vertical sectional view taken along the line and in the direction of the arrows 5—5 of FIG. 4, of one of the support pad systems such as is illustrated in FIGS. 3 and 4, with the view being taken generally diametrically of the support pad, and illustrating drive means for controlling the angular disposition of the support pad.

In accordance with a preferred embodiment of the present invention, and with attention being directed to FIG. 1 of the drawings, the solar energy concentrator system illustrated includes a generally centrally disposed column generally designated 10, supporting a solar receiver means 11 at the top thereof, and with an array of pivotally mounted support pads generally designated 12 disposed circumferentially therearound. As is illustrated in FIG. 1, and particularly relative to pad 13, a plurality of pivotally mounted solar reflective elements are arranged on the surface of the support pad, with these elements being shown in greater detail in FIG. 3, as at 15—15. Each of the solar reflective elements 15—15 is arranged in appropriately spaced apart rows and columns, such as the column as at 16, and the row as at 17. Each of the support pads, such as support pad 13 is arranged to pivot about its central axis, with this arrangement being shown in greater detail in FIG. 5. Also, as is indicated in FIG. 5, each of the solar reflective elements, such as the elements 15—15, is arranged to be tilted about the axis of pivotal mounting means, shown generally at 20. In this arrangement, therefore, solar energy may be directed and concentrated from the individual solar reflective elements 15—15 onto the solar receiver means 11. As will be described in greater detail hereafter, the individual solar reflective elements are preferably generally planar in configuration, and are preferably provided with means for achieving lateral adjustment in the form of second order correction in the horizontal plane so as to produce a resultant Fresnel approximation of a parabolic reflector, thus increasing the portion of incident solar energy reflected by the reflective elements onto the solar receiver means 11.

DESCRIPTION OF THE SUPPORT PADS

Figures 4, 6:
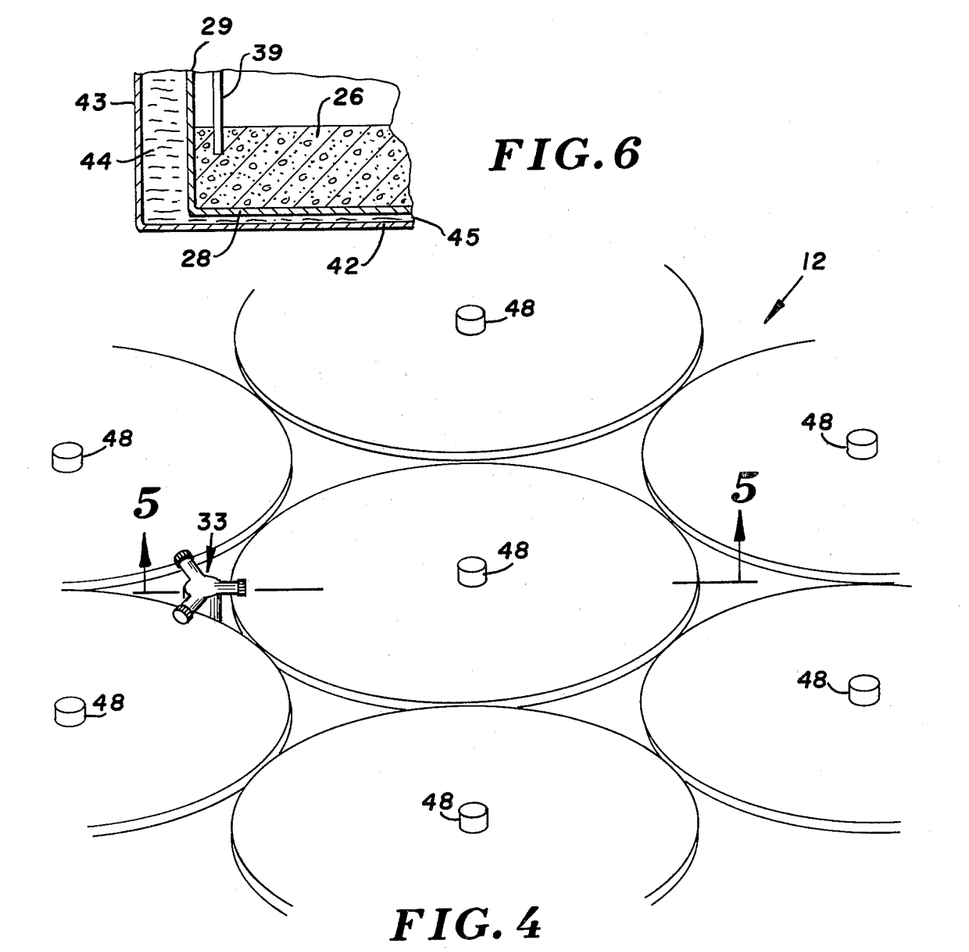
FIG. 4 is a top perspective view of a group of support pads such as is illustrated in FIG. 3, and illustrating the manner in which the individual support pads are grouped, one to another.
FIG. 6 is a fragmentary view portion on an enlarged scale and being taken generally about the circled area of FIG. 5.

The individual support pads included in the array generally designated 12, and particularly as shown in FIGS. 5 and 6, are each essentially identical, one to another, hence the description of one unit will reasonably suffice as a description for all. The support pad generally designated 25 in FIG. 5 includes a unitary base 26 in the form of a turntable or the like, having a support surface 27 upon which are mounted the individual solar reflective elements 15—15. It will be appreciated that for purposes of this discussion, that the diameter of the pad is broken away, thus providing ease of draftsmanship for the structure. Base 26 is arranged and disposed within a cylindrical shell arrangement having a base support surface 28 along with upstanding flange or sleeve wall 29. The entire arrangement is supported upon structural support column 30 which is provided with suitable bearings 31—31, and is further provided with drive means generally designated 33 to achieve pivotal rotation of support pad 25 about its central axis. Drive means 33 includes motor 34 having a gear box 35 with an output shaft 36 driving pinion 37. An individual drive means, such as drive means 33, may include a plurality of output shafts to controllably and adjustably position a number of individual support pads, with each pad preferably being provided with means for separately adjusting the rotation of each individual support pad. Inasmuch as the motion can be achieved intermittently with each support pad, one separate drive means may be shared between a number of support pads. A rack 38, in the form of a crown gear, is provided about the periphery of flange wall 29, with the rack being supported in base 26 by means of support posts 39. Support posts 39, in their disposition, provide for physical coupling between rack 38 and base 26.

In order to minimize the load on the centrally disposed bearings, and in order to avoid the need for a heavy support arrangement, an annular floatation arrangement is provided which will, in effect, permit the floatation of base 26. An outer housing arrangement including an imperforate base 42 having upstanding cylindrical flange wall 43 secured thereto is provided, thus defining an annular zone 44 between the outer surface of flange wall 29 and inner surface of flange wall 43. Water or other suitable buoyant fluid is placed within the confines of the annular zone, and provides for floatation, as is indicated by the spacing shown at 45 between the surface of base support surface 28 and the inner surface of imperforate base 42.

In certain environmental arrangements, it may be desirable to employ suitable anti-freezing solutions such as brine, glycols, or the like. At any rate, the fluid contained within the arrangement is sufficient to provide floatation of the entire assembly, thus relieving any unusual or heavy vertical loading on support column 30, and reasonably eliminating the requirement for heavy-duty bearings to permit relative rotation of support pad 25 about support column 30.

In order to provide electrical energy to the arrangement, such as may be required in the tilting of individual columns of solar reflective elements, electrical cable is utilized, such as is illustrated at 47, and extending through weather-cap 48 into individual drive motors 49—49. As an alternate source of power, hydraulic fluid under pressure may be utilized to drive hydraulic motors to achieve the positioning of the support pads or the solar reflective elements arranged thereon.

The manner in which the individual support pads may be rotated will be, of course, dependent upon the arrangement of the system. It is possible for an individual motor and drive means be provided for each such support pad, it being understood, however, that a number of these pads can be coupled together so as to simultaneously rotate, preferably in simultaneous and coupled relationship. Also, as has been indicated hereinabove, the purpose of the drive means 33 is to derive a positioning of support pad so as to provide a proper azimuth for the individual solar reflective elements at an angle appropriate for reflection of incident radiation upon the solar receiver.

A. DETAILS OF PAD DESIGN AND CONFIGURATION

Figure 3:
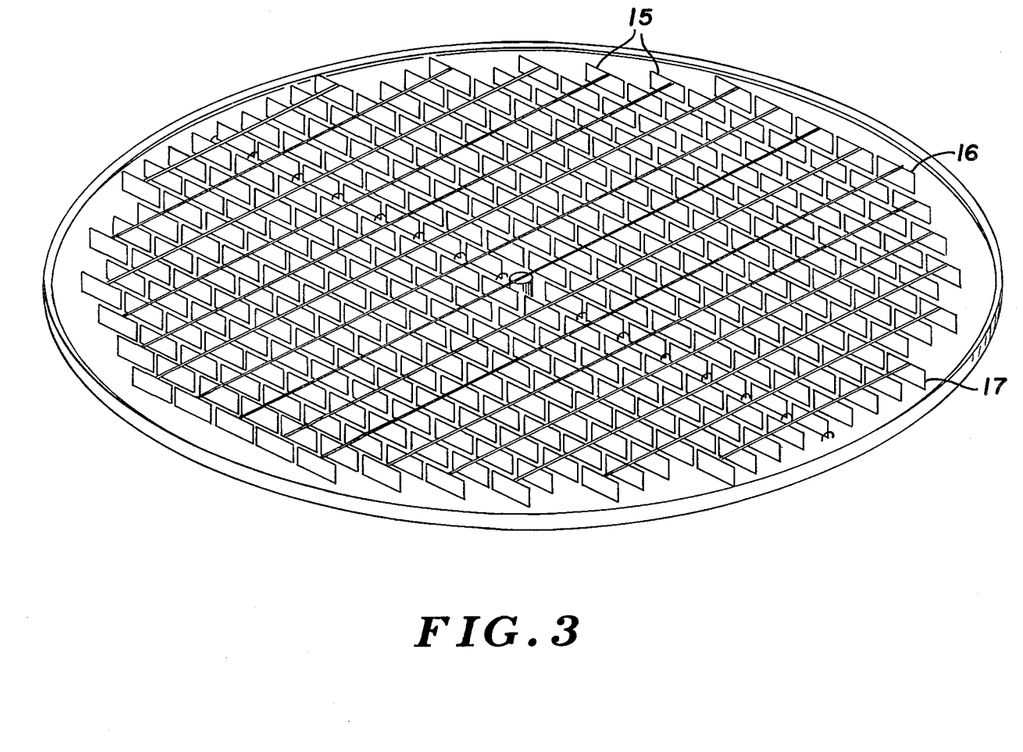
FIG. 3 is a top perspective view, on an enlarged scale, of one support pad, the pad containing a plurality of rows and columns of solar reflective elements thereon.

For normal purposes, each support pad in the array may be fabricated by casting a 200-foot diameter, 4-inch thick reinforced concrete platform. In a typical hexagonally arranged, close-packed array, 805 such platforms may be positioned in a 1-square mile area. Each such platform provides a surface area of 31,416 square feet, and on the average, reflector area may be available the reflectors having a total area of 22,000 square feet, for example, with each solar reflective panel having a dimension of 5 feet × 10 feet. As has been indicated, these panels will be arranged on the pad in rows and columns, particularly as illustrated in FIG. 3.

SOLAR REFLECTOR MEANS

Individual panels are formed by stretching or applying a clear film having a reflective side arranged or deposited thereon. Specifically, 1-mil Type A polytetrafluoroethylene vacuum coated on the inner surface with a film of metallic silver, 1000 A applied thereon. This surface is thereafter laminated to a clear film of biaxially stress-oriented polyethylene terephthalate, widely available under the name "Mylar." In order to provide greater durability, the system may be backed with a 1-mil layer of stress-oriented polyethylene terephthalate reinforced by laminating woven polyester threads such as polyethylene terephthalate threads (Dacron) on the inner surface to provide a structurally higher modulus wind barrier and to provide overall a flexurally balanced, stressed-skin panel.

These panels are then mounted in a regular array, rows and columns, on the concrete pad with two-point bearings providing for approximately 1-inch lateral adjustment at the bottom corners thereof for second order or fine focal adjustment. Columns of this type of device are driven in synchronism for arranging an appropriate angle of tilt by brackets or arms extending across the top and between the individual solar reflective elements.

Figure 7:
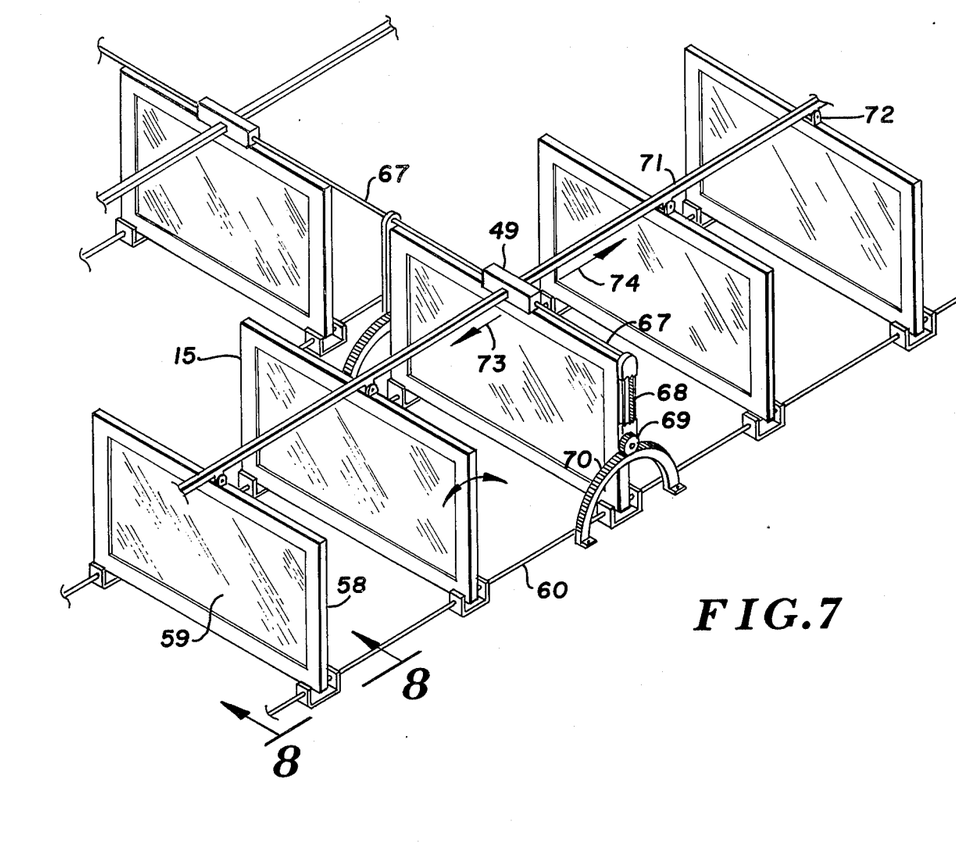
FIG. 7 is a top perspective view illustrating the manner in which a plurality of individual solar reflective elements are ganged together for controlling the angular elevation thereof.
Figure 8:
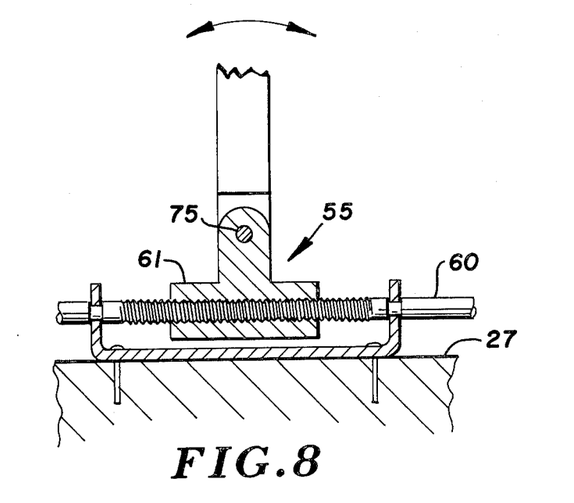
FIG. 8 is a detail sectional view taken along the line and in the direction of the arrows 8—8 of FIG. 7, and illustrating the manner in which the column of solar reflective elements may be adjustably angularly controlled so as to achieve a Fresnel approximation of a parabolic mirror therefrom.
Figure 9:
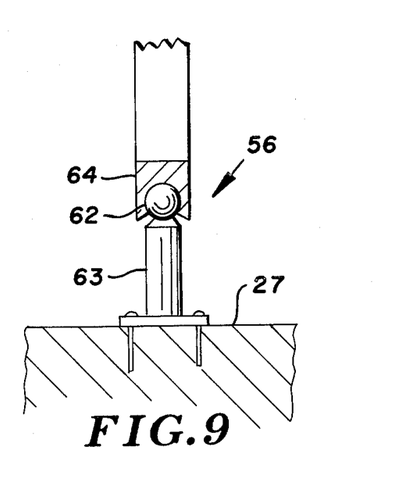
FIG. 9 is a vertical sectional view similar to FIG. 8 and illustrating a modified mechanism which may be utilized to mount one end of the solar reflective elements to the base supporting pad with the other end being similar to that device of FIG. 8.
Figures 12, 13:
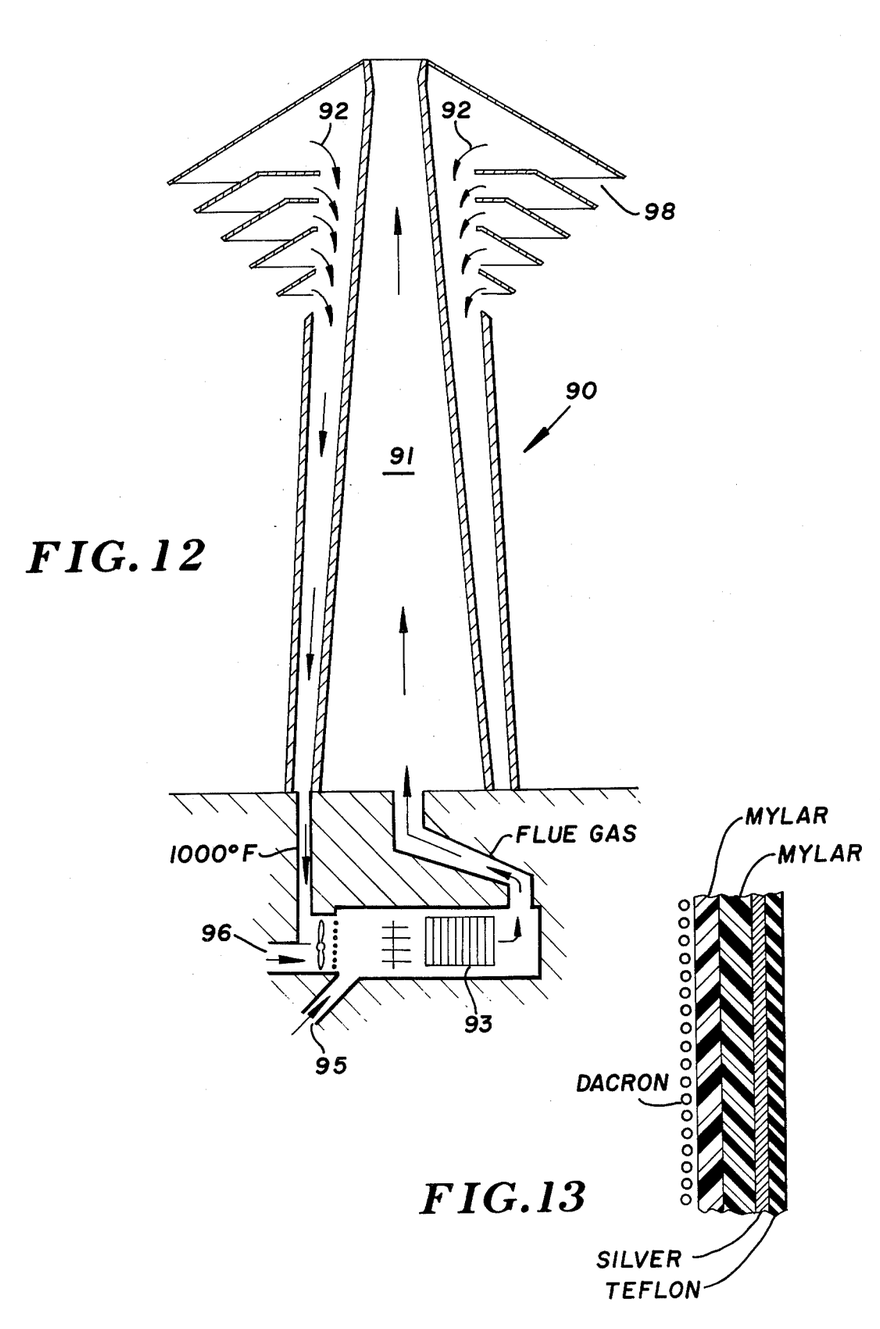
FIG. 12 is a view similar to FIG. 10 and illustrating a modified form of a solar collection means with the tower being shown in shortened disposition.
FIG. 13 is a detail fragmentary sectional view of one panel forming a solar reflector, and illustrating the laminations employed.

The details of this arrangement are shown in FIGS. 7, 8 and 9. Specifically, individual elements 15 are mounted upon surface 27 by means of base mounting members generally designated 55 and 56 (FIGS. 8 and 9). Elements 15 include, of course, a rigid backing member 58 upon which the metallized layers are placed. Backing member 58 may be in the form of a frame in order to lighten the weight of the structure, as is illustrated in FIG. 7, this frame member 58 thereby providing a support for metallized film layer 59. In order to alleviate problems due to bowing or possible convexing or concaving of the reflective surface, it may be desirable to provide a rigid backing either applied directly to the reflective layer, or spaced therefrom, in order to avoid deflections due to wind loading. The details of the film layer 59 are illustrated in FIG. 13 of the drawings, and reference may be had to that figure for the description.

In mounting these elements, an adjustable mount may be provided at one edge as shown at 55, with shaft 60 extending therethrough and having a split-captured nut 61 disposed thereabout. Rotation of shaft 60, therefore, will laterally adjust the disposition of elements 15—15 so as to achieve Fresnel approximation. At the opposed end, an identical adjustable mount is provided with shaft 60A extending therethrough and having a split-captured nut disposed thereabout and controlling the angular disposition of the frame means. It will be appreciated that rotation of the shafts 60 and 60A in the same direction will control the angle of elevation, $\theta_t$, while rotation of these shafts in opposed directions will control the azimuth angle $\beta_t$. It will be appreciated that this adjustment is a second order adjustment for achieving a greater degree of Fresnel approximation. If desired, and as an alternate, a ball and socket pivot may be provided including the ball 62 mounted on post 63, and received within socket 64. This arrangement allows second order adjustment of the azimuth angle only, and does not provide for control of the elevation angle.

In order to achieve controlled adjustment of elevation angle of a large number of reflective elements, such as all of the members of a column, motor 49 is provided to drive output shaft 67, and timing belts 68 (or sprockets and chains) in turn drive a pinion 69 across arcuate rack 70, thereby achieving adjustment of the elevation of a group of individual reflective elements. This motion is ganged to other reflective elements in the same column by means of rod 71 which is pivotally coupled to each of the members by pivotal coupling 72, thereby permitting motion to occur in accordance with the arrows 73 and 74, with this motion being possible by virtue of coaxially arranged pivot members 75—75 at each end of the panel. In certain instances, ball and socket joint systems are utilized to achieve this motion, with the pivot axis then extending through the diameter of ball 62. In this fashion, therefore, it is possible to achieve a closely packed arrangement incorporating 440 planar panels, each having a dimension of 5 feet × 10 feet. As is indicated in FIG. 5, it is possible to reduce the number of drive means such as motor 49 for controlling the elevation angle of the system of reflective elements. In this connection, therefore, shaft 67 may be extended to adjacent columns and with clutch-brake systems being employed, individual columns may be adjusted, as required, at predetermined times.

FINE LATERAL ADJUSTMENT

In order to achieve Fresnel approximation, the center column of panels will, of course, be directed and focused directly upon the solar collection or collector site. Those panels which are disposed outwardly laterally from the center column will necessarily be "tweaked" into position so as to define a focal point at the collector site. Inasmuch as the sun subtends an angle of arc of approximately 9 milli-radians, the steering errors are not particularly significant; however, it will be appreciated that the performance of the system may be enhanced if steering errors are either eliminated or reduced.

Inasmuch as the longest column of reflective elements on the support pad spans a total of 200 feet, and utilizing 5-foot high panels with a mean shadow factor of 0.70, there may be 28 panels arranged with a common angular positioning drive 49. Inter-reflective element spacing will be different for those panels disposed on the South side of the central column, as compared to those disposed on the North side. On the south side, the reflective elements may be closely packed with a panel height/panel spacing ratio being of the order of 1.0. For those reflective elements disposed on the North side of the central column, the panel height/panel spacing ratio is of the order of 3. The reflective elements disposed between these limits will, of course, have graduated ratios between values of 1 and 3. The overall system average, because of the more closely packed arrangements permitted on the South side, provide an average value of the order of 1.4 – 1.5.

A. PLATFORM ROTATION ADJUSTMENT

During a normal day, it will be necessary to rotate the support pads at an angular rotation of approximately 1-milli-radian per 30 seconds. With the use of a 200-foot support pad, this rotary drive motion may be readily achieved with a small rotary drive digital stepping motor, which would, in this instance, be motor 34. The rotation of the individual panels for controlling elevation occurs at a maximum rate of motion of the order of 0.060 inches per 30-second up-date. Thus, it is appreciated that a single drive unit may be employed for all of the panels in a column, and furthermore that certain columns may share a single drive motor as shown in FIG. 5.

ENVIRONMENTAL PROTECTION

In order to protect the individual reflective elements from possible damage due to adverse environmental conditions, such as hail storms, dust storms, sand storms, and the like, means are provided for tilting the individual panels to a substantially horizontal disposition, with the reflective side disposed downwardly. In addition to protection during adverse environmental conditions, such an arrangement will permit de-focusing of the system upon indication of problems in the solar receiver, such as, for example, interruption of flow of energy absorbing materials through the solar receiver. In the arrangement as described, even those panels disposed on the South side of the central column will be capable of being disposed flatly on the surface, with the reflective surface being disposed downwardly to protect this surface from the elements.

SHADOWING AND SHADING

The spacing of individual reflective elements, one from another, is controlled, as indicated hereinabove, so that effective reflector area must equal at least 0.7 times the land area covered, thus rendering average interpanel spacing of 7.14 feet for panels 5 feet in height. The individual columns may be spaced apart by only that distance required to accommodate tweaking equipment and normal servicing.

CENTRAL COLUMN AND SOLAR RECEIVER

The tower design characteristics are illustrated in FIGS. 1, 2, 10 and 12. Referring initially to FIG. 1, it will be observed that the tower 10, for the system described hereinabove, may have a height of about 1,000 feet. Energy is converted by virtue of heat exchange tubing which is available at the receiver site 11, and shown in detail in FIG. 10 at 80. Feed water is lifted from a pumping station at ground level through coils 80 at a rate of the order of 100 pounds of feed water per second. This is achievable utilizing pumping power of the order of 1200 hp. A multi-pass boiler may be utilized, with feed water first passing at lowest temperatures near the outer surface, and then undergoing super-heat passes further back in the core. This arrangement is possible with a gradation of trapping of radiation along the depth of the core formed by tubing elements 80. This feature also provides for minimum heat loss to the environment, since the outer surfaces will normally be the coolest and may also be provided with a surface coating having relatively low emissivity.

Figure 10:
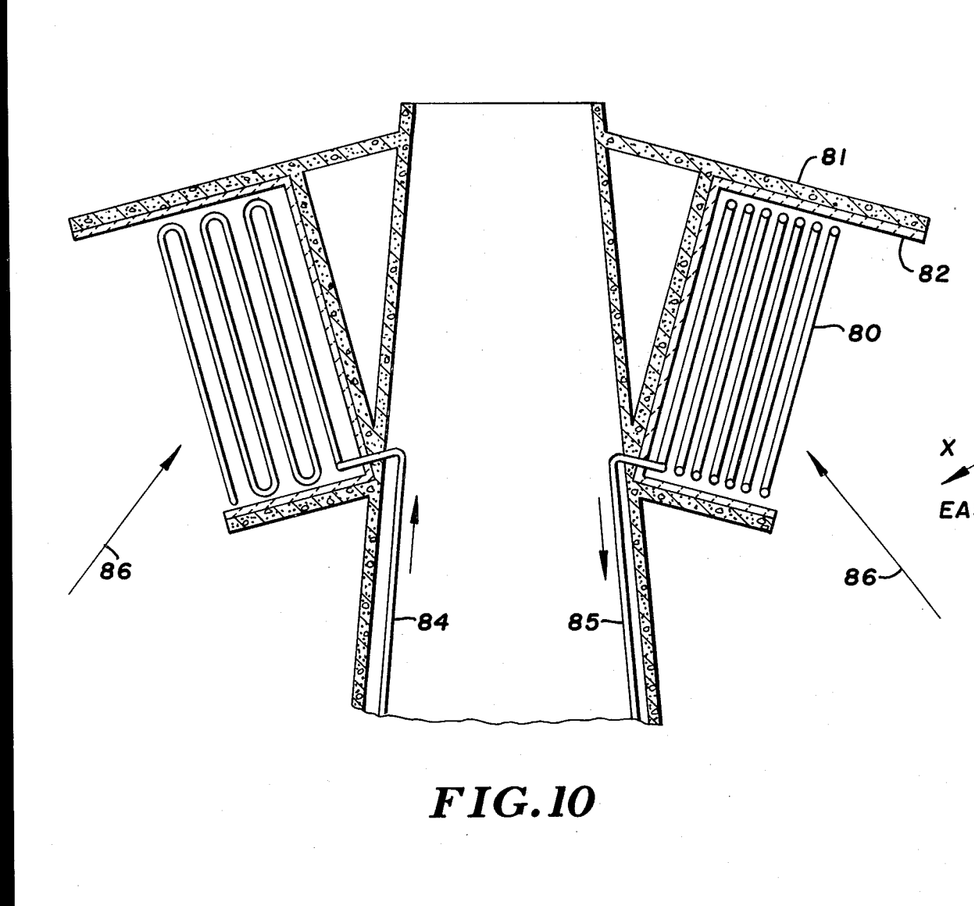
FIG. 10 is a detail sectional view, on an enlarged scale, and illustrating the details of the solar energy collection site at the top of the centrally disposed column.

In the system illustrated in FIG. 10, for example, the tubing arrangement 80 is disposed beneath a weather-convection barrier 81, with fire-brick lining being provided as at 82. Feed water enters the system through lines, where indicated, in the direction of arrow 84, with superheated steam being delivered from the system through the line as shown by arrow 85. Concentrated flux meets the system, as indicated by arrow 86.

A modified form of solar receiver is illustrated in FIG. 12. In this arrangement, stack generally designated 90 is provided with an inner core member 91, which forms a flue for the system, with incoming air entering the system in accordance with arrows 92—92, passing through louvers having heated surfaces, and then passing into a counter-flow boiler as at 93, and thereafter being exhausted through the flue 91 as conventional flue gases. In this arrangement, it is also possible to provide a standby system or a supplemental system utilizing powdered coal or other fossil fuel medium entering the system through port 95, provided with normal forced draft entering the system through line 96. In periods of sunlight, the inlet air will be heated by virtue of the concentrated solar flux as at 98, with powdered coal being utilized to supplement the solar energy system during periods of darkness or extensive cloud cover.

GENERAL DESIGN CONSIDERATIONS

It will be appreciated that the f-number of the system will be a function of the dimension as follows:

$$f = \frac{T}{D}$$

wherein $f$ equals the $f$-number of the system, $T$ represents the distance of the center of a support pad to the receiver site, and where $D$ represents the diameter of the support pad. The off-axis aberrations of the Fresnel approximated "parabola" formed by the individual reflective elements or panels on any one platform will not introduce steering errors, or spreading of the image formed at the receiver, of a magnitude comparable to the spread in the received solar energy (9-milli-radians) until the ratio $f = T/D$ becomes less than about 5. In such an arrangement, the system is functional with a dimension $R$ being equal to any appropriate length.

OPERATIONAL STEERING

Figure 11:
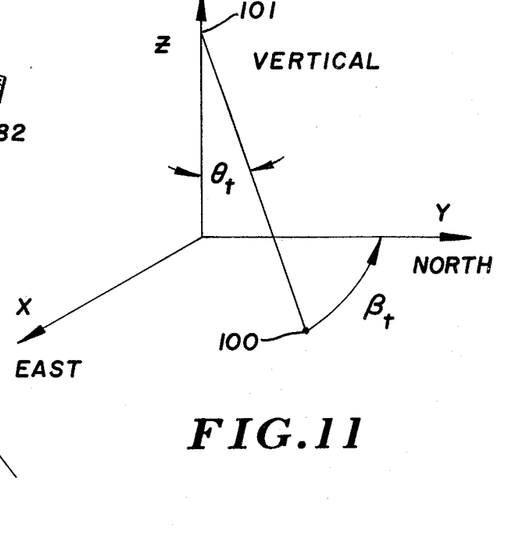
FIG. 11 is a schematic diagram of three coordinates of planes, which is believed helpful in the presentation of the present invention.

With attention being directed to FIG. 11 of the drawings, it will be observed that the angle $\beta_t$ represents the azimuth angle, with the elevation angle being represented by $\theta_t$. On a reflective surface disposed at the point 100, the angular disposition of the planar surface will be that necessary to reflect the incident radiation on the vertical axis $Z$ at the intersection point 101. Such angular adjustments are, of course, possible with the focusing being made possible through either advance calculations or empirical testing on site.

MATERIALS OF CONSTRUCTION

It will be appreciated that conventional materials of construction may be employed for the individual support pads, as well as for the remaining components of the system. While the arrangement of components utilized in the preparation of the reflective elements has been discussed previously, reference is made to FIG. 13 of the drawings for a detailed cross-sectional view of the individual layers involved.

I claim:

1. Solar energy concentrator means, comprising in combination:

a. a centrally disposed column means having solar receiver means arranged at an elevated disposition thereon and having means defining a central system axis, pivotally mounted support pads, each pad supportably retaining an array of solar reflective elements, with each of said pivotally mounted support pads being disposed about said column and spaced outwardly from said central system axis;

b. means supportably mounting said support pads for axial rotation about the central axis thereof, and first drive means for controllably rotating each of said pads about the central axis of each of said pads;

c. said solar reflective elements being mounted upon said support pads for pivotal arcuate rotation of said reflective elements about a generally horizontal support axis;

d. said solar reflective elements having at least one surface reflective to solar radiation, with said reflective surface being mounted upon support frame means, second drive means providing rotational movement of a plurality of said support frame means about said generally horizontal support axis;

e. said second drive means positioning said support frame means to provide substantially concurrent reflection of incident solar radiation from each individual solar reflective surface on each of said support frame means onto said solar receiver means.

2. The solar energy concentrator means as defined in claim 1 being particularly characterized in that said pivotally mounted support pads are arranged generally coaxially about said central system axis.

3. The solar energy concentrator means as defined in claim 1 being particularly characterized in that said solar reflective elements are generally planar.

4. The solar energy concentrator means as defined in claim 1 being particularly characterized in that said second drive means is arranged to pivotally rotate said solar reflective elements into generally horizontal disposition opposed to the surface of said support pads.

5. The solar energy concentrator means as defined in claim 1 being particularly characterized in that third drive means are provided for rotational movement of a plurality of said support frame means about a generally vertical pivot axis normal to said first generally horizontal support axis for achieving second-order positioning of certain support frame means upon said support pads.

6. The solar energy concentrator means as defined in claim 5 being particularly characterized in that said third drive means provides motion about said vertical pivot axis in a generally horizontal direction normal to said pivot axis.

7. The solar energy concentrator means as defined in claim 1 being particularly characterized in that said support pads are supported buoyantly upon fluid supports.

8. The solar energy concentrator means as defined in claim 7 being particularly characterized in that said fluid is a liquid.

9. The solar energy concentrator means as defined in claim 1 being particularly characterized in that said solar reflective elements comprise a metallic film applied to the surface of a flexible clear plastic film, and wherein said films are arranged as a taut membrane on said support frame means.

* * * * *